United States Patent [19]
Kauffman

[11] Patent Number: 5,586,235
[45] Date of Patent: Dec. 17, 1996

[54] INTERACTIVE MULTIMEDIA SYSTEM AND METHOD

[76] Inventor: Ivan J. Kauffman, 140 Tennessee Ave., NE., Washington, D.C. 20002

[21] Appl. No.: 951,015

[22] Filed: Sep. 25, 1992

[51] Int. Cl.$^6$ .................................................... G06F 17/00
[52] U.S. Cl. ........................... 395/761; 395/806; 395/326; 345/168
[58] Field of Search .................................... 345/145–149, 345/154–155, 161, 168, 172; 395/159

[56] References Cited

U.S. PATENT DOCUMENTS

| | | | |
|---|---|---|---|
| 5,159,669 | 10/1992 | Trigg et al. ............................... | 395/159 |
| 5,241,671 | 8/1993 | Reed et al. ............................... | 395/600 |
| 5,339,392 | 8/1994 | Risberg et al. .......................... | 395/161 |
| 5,388,196 | 2/1995 | Pajak et al. .............................. | 395/153 |
| 5,446,837 | 8/1995 | Motoyama et al. ..................... | 395/145 |

OTHER PUBLICATIONS

An object–Oriented Approach to Multimedia Databases, D. Woelk, W. Kim, and W. Luther, Microelectronics and Computer Technology Corp., ACM Proceedings 1986, pp. 593–606.
Computer, "Computer–Based Multimedia Communications," J. J. Aceves and A. A. Poggio, vol. 18, No. 19, Oct. 1985, pp. 10–11.
Computer, "Reading and Writing the Electronic Book," N. Yankelovich, N. Meyrowitz and A. van Dam, Oct. 1985, pp. 15–30.
Computer, "Computer–Based Real–Time Conferencing Systems," S. Sarin and I. Greif, Oct. 1985, pp. 33–45.
Computer, "Ofice Document Architecture and Office Document Interchange Formats: Current Status of International Standardization," W. Horak, Oct. 1985, pp. 50–60.
Computer, "A Survey of Graphics Standards and Their Role in Information Information Interchange," P. R. Bono, Oct. 1985, pp. 63–75.
Buyer's Guide, "MacUser, The MacUser Multimedia Encyclopedia," Feb. 1991, pp. 1–66.

PC/Computing, "Multimedia," Oct. 1992, pp. 169–185.
Byte, "The Multimedia PC: High–Powered Sight and Sound on Your Desk," T. Yager, Feb. 1992, pp. 217–226.
PC Magazine, First Looks, Dec. 17, 1992, pp. 35–46.
The Wall Street Journal, "Bring the world your senses," Oct. 8, 1992, pp. A7–A8.
PC World, Industry IO Outlook, "Windows Dives Into Multimedia," E. Bender, Feb. 1991, p. 55.
Byte's Essential Guide to Windows, "Windows Speaks," T. Yager, 1992, pp. 33–41.
PC/Computer, "Word for Windows Gets Hot Multimedia Boost," Sep. 1992, pp. 36–38.
Byte, "Windows 3.1 Is Ready to Roll," J. Udell, Apr. 1992, pp. 34–36.
Windows Magazine, "Lights, Camera, Action!," J. D. Ruley, Nov. 1991, pp. 138–139.
NewsMedia Age, "Multimedia System Software Tide Rising, " D. Todd, B. Calica, Jun. 1991, pp. 8–10.
IBM, "Columbus" Encounter, Discovery and Beyond, Copyright 1991.
IBM, "Illuminated Books and Manuscripts," Copyright 1991.
IBM, "Multimedia Solutions," Mar./Apr., 1992, vol. 2. No. 2, pp. 3–35.
IBM, "Ultimedia, the ultimate in multimedia solutions," Copyright 1991.

(List continued on next page.)

Primary Examiner—Heather R. Herndon
Assistant Examiner—Joseph H. Field
Attorney, Agent, or Firm—Finnegan, Henderson, Farabow, Garrett & Dunner, L.L.P.

[57] ABSTRACT

A multimedia system contains documents which are made up of pages. Each page has at least one asset, page execution script which indicates the actions be performed on the assets, and a set of exit conditions which indicate actions to be taken when user inputs are received from an input device. The assets contain information to be output or algorithms to be followed.

29 Claims, 15 Drawing Sheets

OTHER PUBLICATIONS

IBM, Customized Summary, Nov. 13, 1992, pp. 1–8.
"The New World on a Disc," R. Epstein, Los. Angeles Times, Jun. 1, 1991, pp. 6–7.
PC Magazine, "Storyboard Live! Melds Presentation & Multimedia," L. Simone Feb. 12, 1991, p. 38.
Computerworld, "IBM released Storyboard Live to match multimedia promises," P. Keefe, Nov. 19, 1990.
PC Magazine, "The Audio Visual Connection, Turnkey Multimedia From IBM," A. Poor, May 15, 1990, pp. 157–164.
IBM, "Lights . . . computer . . . action!," Copyright 1989.
IBM, "The Action Media" 750 Delivery and Capture Adapters, Copyright 1990.
IBM, "The M–Motion Video Adapter/A," Copyright 1990.
"IBM Launches LinkWay," Apr. 1989.
IBM, "Personal System/2 8516 Touch Display," Copyright 1991.
IBM, "ActionMedia II Display Adapters and Capture Option," Copyright 1991.
"Making compact disks interactive" R. Bruno, IEEE Spectrum, Nov. 1987, pp. 40–45.
"Home Interactive Systems: New Media for an Information Society and its Technological Innovations," S. Veenis, Optical Information Systems, May–Jun., 1988, pp. 127–131.
"the silver disk," N. K. Herther, Online, Jan. 1988, pp. 68–73.
"The Imagination Machine" by Philips (date unknown).
"Interactive Compact Disk: First Look," Video View, R. Goldberg, Mar. 1992 pp. 30–34.
Philips CD–I Advertisement, Copyright 1991.
"CDTV First Look," Video Review, Jul. 1991, pp. 38–42.
"Now, CD's Emit Sights as well as Sounds," E. Shapiro, The New York Times, May 12, 1991.
"Alphabet Soup, With a Dash of Hype," The New York Times, Jan. 8, 1993.
"Tandy goes After the Interactive Home Market," Byte, News Microbytes, Nov. 1992, p. 40.
Presentation Products Magazine, Newsworthy, May, 1992, p. 8.
"Tandy Seeks Leadership Role with Multimedia–Capable CD Drive," PC Magazine, Sep. 24, 1992, p. 52.
"Tandy's Talking PC," PC World, Jul. 1991, pp. 107–108.
"The Interactive Multimedia Association," B. Marquardt, Instruction Delivery Systems, Jul./Aug., 1992, pp. 13–17.
"Multimedia suffers standards lack," M. Alexander, Computerworld, Aug. 12, 1991.
"Multimedia" Big boys use standards as a weapon H. Newquish, Computer–world, Feb. 25, 1991, p. 23.
"Applied and IBM Make It Legal, Outline Five–Point Plan for New Products in the Nineties," PC Magazine, G. Venditto, Dec. 17, 1991, pp. 29–30.
AV Video, "Apple" 'Media Integration' Is What we Do; More to Come, J. Cillo, Jan. 1991, pp. S12,13,16.
AV Video, "Commodore Amiga, Multimedia Vet, Aids in Presentations, Training," J. Strothman, 1991, pp. S14,16.
"Software Network: Several Corporate Giants Line Up Behind a New Venture in 'Interactive' Technology," The Wall Street Journal, Jan. 7, 1993.
The 3DO Company, "Partnership Has Software, Hardwre, Chip, Networking Expertise; Provides Access to Hollywood Properties, Cable Households," L. McEnany, N. Ronstadt, and J. Strauss, Jan. 7, 1993, pp. 1–4.
The 3DO Company, "3DO Unveils Breakthrough Technology For New Consumer Electronics Standard," Jan. 7, 1993, pp. 1–6.
"The 3DO Company Technology Background," Jan. 1993.
"Imagine Being Able To Turn On Your TV, Pop in a CD and Sharpen Your Photography Skills Without Touching A Camera," The New York Times, Oct. 17, 1991, p. D14.
"Introducing A Whoe New Way of Looking At Television," The New York Times, Oct. 16, 1991, p. A12.
"Applied to Release Updated Version of HyperCard," Los Angeles Times, Jul, 2, 1990.
"Mouse! Movie! Sound! Action," J. Markoff, The New York Times, Oct, 27, 1991.

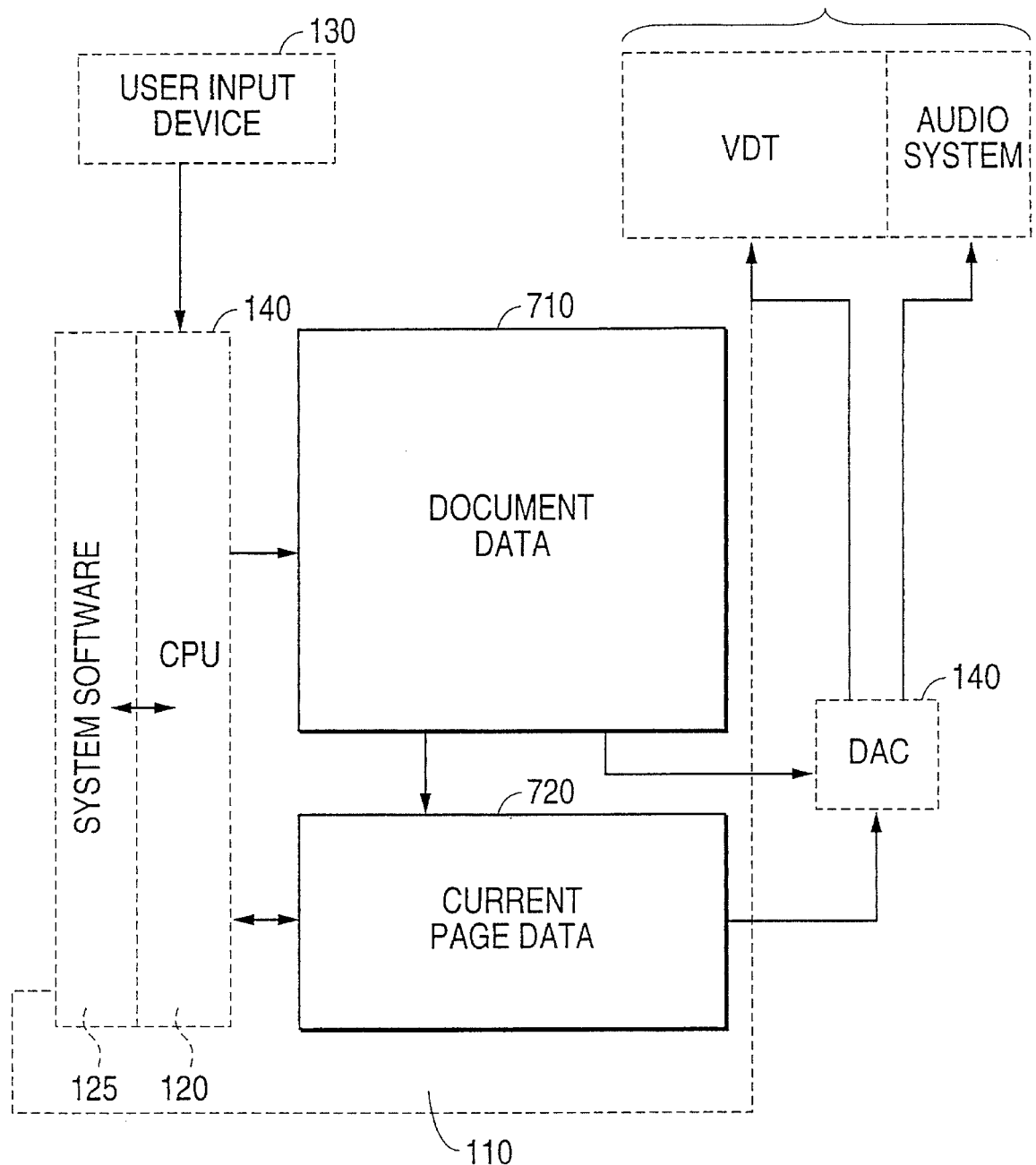

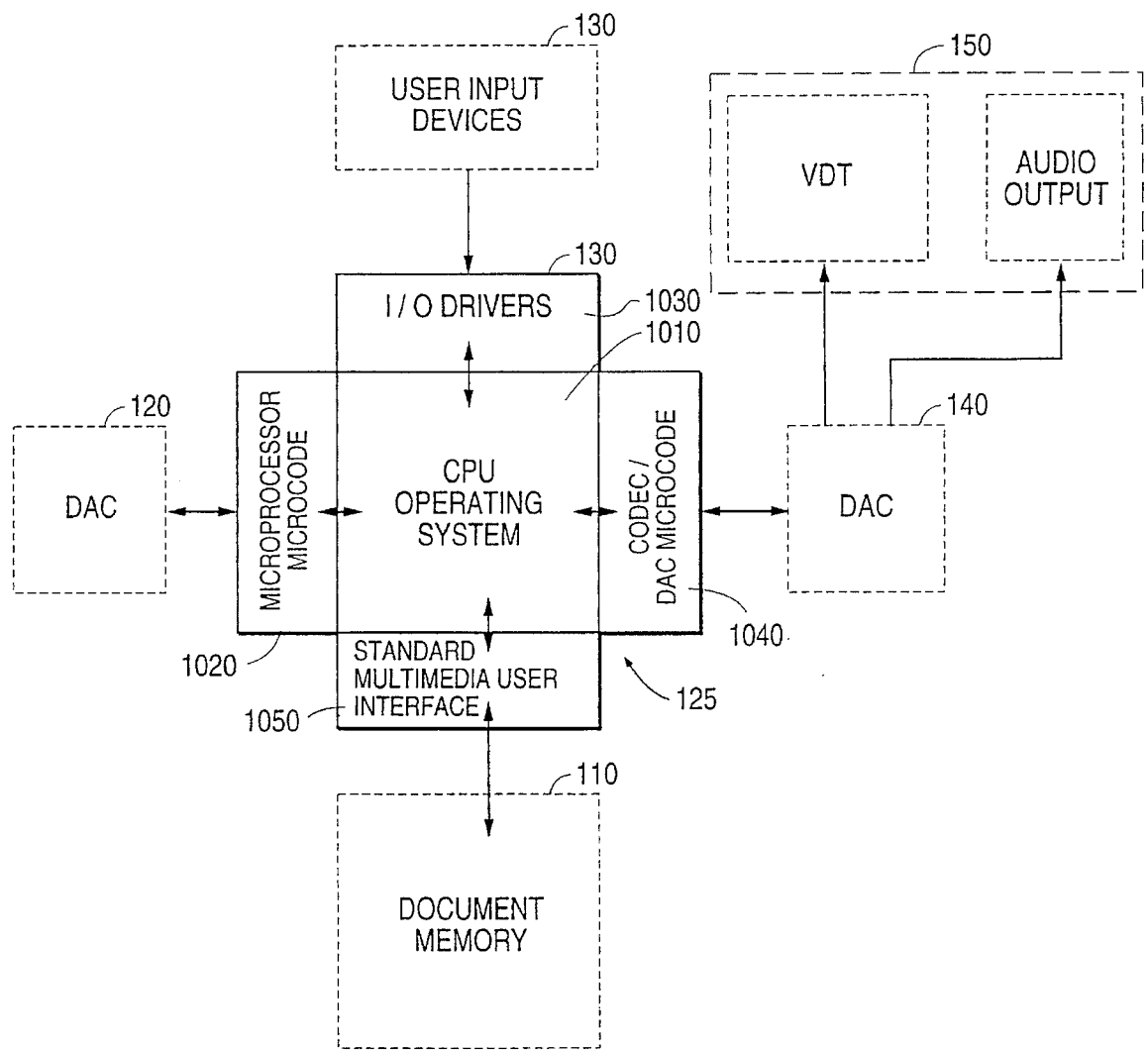

PLAY Videoasset1
SHOW Stillphoto1
HEAR Audioasset1
MOVE Graphicasset1
    from Window 3 to Window 7
    normal speed
    straightline path Right Arrow = Page B2
Up Arrow = Page A3
Down Arrow = Index
Left Arrow = Backtrack

INTERACTIVE MULTIMEDIA SYSTEM AND METHOD

BACKGROUND OF THE INVENTION

FIELD OF THE INVENTION

This invention relates generally to the field of multimedia information systems and, more particularly, to interactive multimedia systems that provide storage and retrieval of digital information.

Multimedia systems are generally understood to be microprocessor-based systems which can store and display more than one from of information. In this context, information can take the form of video information, textual information, photographic information, graphic information including animation and visualization, or audio information. Multimedia systems are finding increasing use in a variety of applications, such as point of sale terminals in retail stores and directories in public buildings, and for education and training in a variety of settings.

Multimedia systems almost always include some interactive capability which allows a user to select and control the output of the different types of information. As used in the following description, the term "interactive" refers to processes by which user inputs cause a system to follow pre-established logical procedures.

Virtually all modern computers can display both text and graphics, and many can produce sound. These computers, however, are not generally considered to be multimedia systems, as that term is generally understood to include systems having a greater capability of displaying both sound and visual information, including motion video, than do conventional computers.

One type of existing multimedia system uses videodisks to store video and audio information. Such systems usually also include a standard computer keyboard as well as other input devices, such as a mouse, a joystick, or a touch sensitive display screen. There are even videodisk systems that use voice recognition units as input devices.

The processors controlling the interactive functions of such videodisk-based multimedia systems generally rely upon standard computer operating systems, such as MS-DOS from Microsoft Corporation, the Macintosh operating system from Apple Computer, Inc., or some version of a Unix operating system. This is where the standardization ends, however. To create, manipulate and output a specific body of information (sometimes called a "document") in a multimedia system of this type, the processors must use special run-time modules and which are frequently, but not always, specific to each document.

Videodisk-based systems also have disadvantages which limit their use. Many of these disadvantages arise from the analog nature of the video information stored on the disk. For example, because videodisk-based systems must usually handle digital as well as analog data, such systems require two separate storage devices and two separate display terminals. Furthermore, analog information of the type which can be stored on a videodisk cannot be transmitted over telephone lines or other transmission media which can transmit digital data.

There currently exist multimedia systems which use only digital information and thus avoid some of the disadvantages of videodisk-based systems. Such systems had been too expensive for mass commercial use, but Intel Corporation recently released a relatively low cost chip set incorporating a technology which has been given the name "Digital Video Interactive" (DVI). Add-on boards for microprocessors based on the DVI technology have been marketed under the trademarks ACTIONMEDIA 750 and ACTIONMEDIA II, and the chips presently available are designated the 82750PB and the 82750DB. The DVI technology has made an all-digital multimedia system economically practical for a wide range of consumers.

Even these all-digital systems have their limitations, however. Currently there are no standard conventions for storing or accessing multimedia information or for using or creating multimedia documents. There are not even standard conventions for assigning file names or for operating input devices. Thus, a user must learn a new set of conventions whenever he changes systems and/or documents.

It is therefore an object of this invention to provide a standard set of conventions and formats for multimedia information systems and documents.

It is further an object of this invention to provide an interactive, all-digital multimedia system having predetermined conventions and standards for documents.

Yet another object of this invention is to provide a set of standard conventions for multimedia systems which makes it relatively easy for a user to create, select and manipulate the digital information in the various documents used in the system.

Still another object of this invention is to provide a common document structure which can be used for many different types of multimedia information.

SUMMARY OF THE INVENTION

To achieve the objects and in accordance with the purpose of the invention, as embodied and broadly described herein, the present invention provides a standard document structure for organizing and storing all information in documents used in a digital multimedia system. Each document includes at least one page, and each page contains at least one asset or file, a page execution script for displaying the contents of the page, and exit conditions for defining what actions to take, such as opening or executing another page, upon receipt of certain input instructions from the user.

More particularly, a multimedia system of this invention for outputting digital information from documents, comprises memory means for storing a plurality of documents, each of which includes a discrete number of pages. Each of the pages contains at least one file accessible by the system, a page execution script for specifying the logical operation to be performed on the files contained in the corresponding one of the pages, and a set of exit conditions each specifying an action to be taken upon receipt of a corresponding input signal from the user. The multimedia system also comprises processing means, user interface means and output means. The processing means is coupled to the memory means and accesses the documents from the memory means, executes the logical operations specified in the page execution scripts of the pages in the documents, and performs the actions specified in the exit conditions of the pages in the documents. The user input means is coupled to the processing means and permits a user of the multimedia system to provide input signals corresponding to the exit conditions specified to the pages. The output means is coupled to the processing means and, in response to commands from the user input means, outputs to the user the information from documents selected by the processing means.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings:

FIG. 2 shows a block diagram of the principal components of a preferred implementation of the multimedia system of this invention.

FIG. 7 shows a schematic of a memory system in accordance with a preferred implementation of this invention.

FIG. 10 shows a diagram of the system software in a preferred implementation of the present invention.

FIG. 3 shows a block diagram of a procedure for forming assets in accordance with this invention.

DESCRIPTION OF THE PREFERRED EMBODIMENTS

Figure 1:
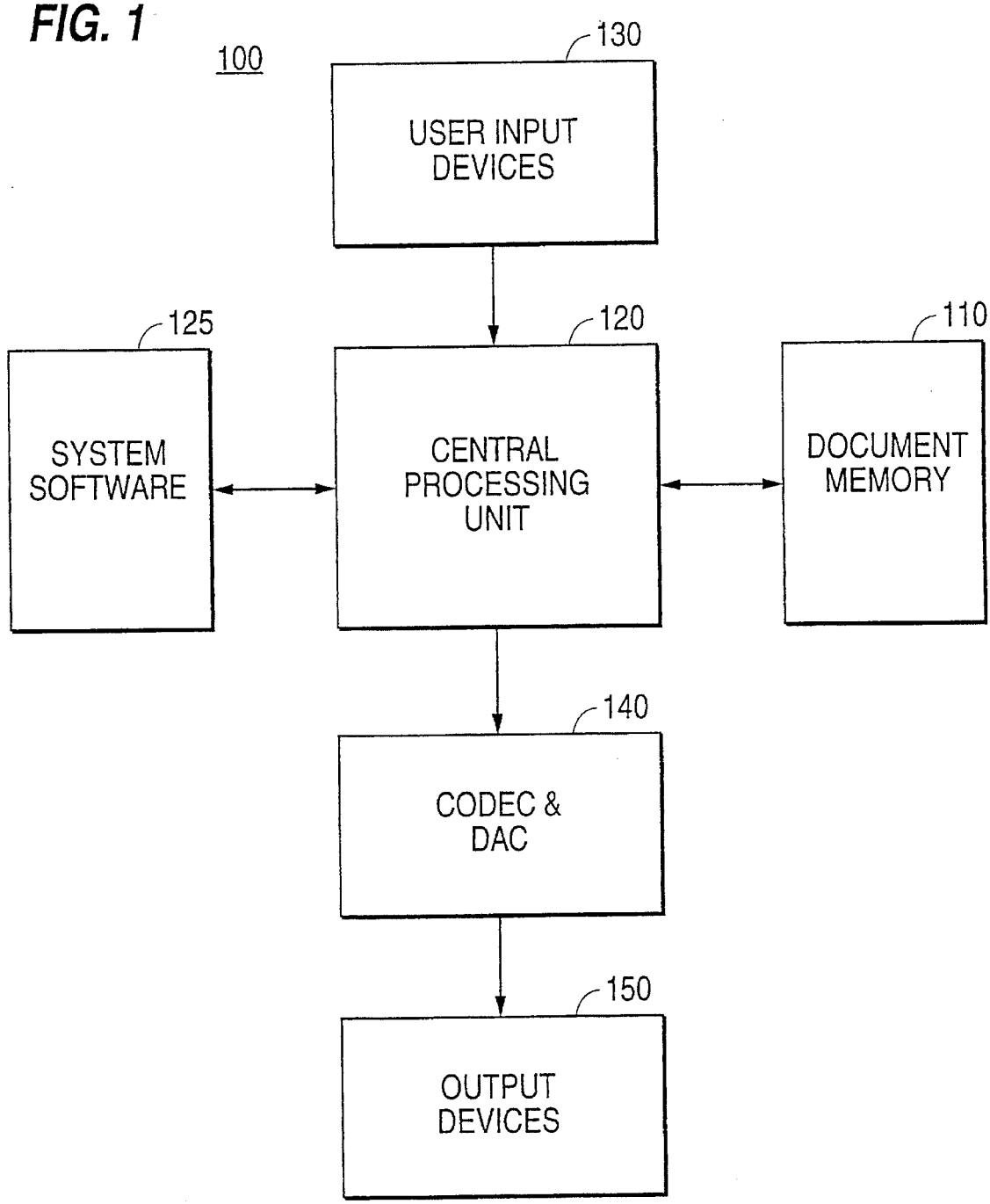

Reference will now be made in detail to the construction and operation of a preferred implementation of the present invention which is illustrated in the accompanying drawings. In those drawings, like elements and operations are designated with the same reference characters. The preferred implementation described below is merely an example of the present invention. The present invention is not limited to this example, but may be realized in other implementations.

FIG. 1 shows a block diagram of a multimedia system 100 which is a preferred implementation of the system of this invention. System 100 includes a document memory 110, a central processing unit (CPU) 120, system software 125, user input devices 130, a compression/decompression (CODEC), digital to analog converter (DAC) device 140, and output devices 150.

In accordance with the present invention, the multimedia system includes memory means for storing a plurality of documents. In the present invention, documents provide the framework for organizing and storing the information in the multimedia system. In system 100, such memory means includes document memory 110. Preferably, document memory includes a primary RAM memory for fast access to information in current use, as well as a secondary memory for storage of information not currently being used. The precise memory configuration is not critical to this invention, however. The preferred organization of memory will be discussed further in connection with the explanation of CPU 120 and system software 125.

Document memory 110 stores the components of the documents used by multimedia system 100 in a specific structure. In this invention, documents have a defined, standard structure which facilitates access to and review of the stored information. The same document structure is used whether the stored information is text, graphics, video, still photographs, audio or anything else which is desired to be accessed and output on the multimedia system 100.

Figure 2A:
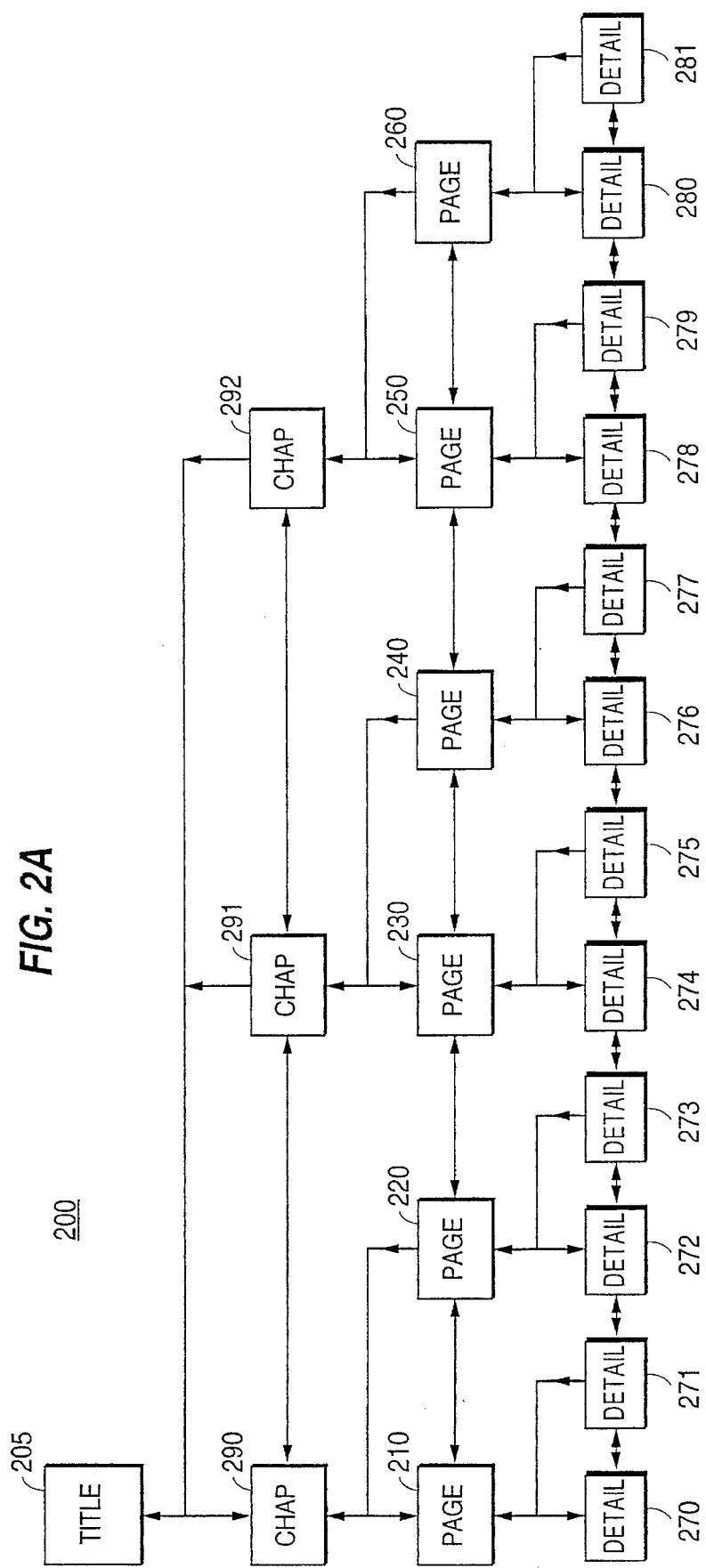
FIG. 2A shows a block diagram of the different components of a document using the standard multimedia-user interface structure in accordance with this invention.

FIG. 2A is a diagram showing a document implemented in accordance with the present invention. Document 200 includes a title page 205 along with several other pages. The pages in document 200 can be at the same relative level of detail, such as pages 210, 220, 230, 240, 250 and 260 relative to each other, or at a relatively greater level of detail, such as pages 270 and 271 would be relative to page 210, or pages 272 and 273, 274 and 275, pages 220, 230, 240, 250 and 260, respectively. The document structure of this invention permits the use of levels, but the use of multiple levels is not required to practice every aspect of the invention. The functional importance of levels and relative detail is discussed more fully below.

The structure shown in FIG. 2A applies to documents regardless of whether the information is text, video, audio, still pictures, graphics, or any other type of information. This structure allows the present invention to be expanded to different types of information without having to rewrite software or retrofit the system for the new types of information.

The concept of a page is also very important to an understanding of this invention. A page in this invention represents a portion of the document which the system allows a user to access with a single input action. The exact parameters of the page are determined by the author of the document, and there are no set rules for how the author must determine the size or number of pages. In general, however, the pages should not be so large as to contain too much information to use effectively, nor too small as to force a user to access several pages to gain certain basic information.

The detail provided by each page can differ according to the organization of the document. This involves the use of levels, as mentioned briefly above. Levels can, but need not, be used to differentiate between the amount of detail in the information contained in a page. If levels are used, then pages with the same detail are placed in different levels, In FIG. 2A, the information in pages 210 and 220 would have a similar amount of detail, but, as explained above, page 270 would have more detailed information than would page 210.

The pages in a document are also preferably organized to reflect a relationship between the information in the pages. For example, the path between pages 210 and 270 indicates that the information in pages 270 is related in some way to that in page 210.

The use of varying levels and the detailed organization of the pages can be important for multimedia documents as it allows a user to find the desired portion of the document quickly and then determine how much information to obtain. For example, if one were seeking information on Ludwig van Beethoven, one may wish to access pages at a high level of detail and obtain only general information. Alternatively, one may wish to proceed to a greater level of detail and access either more detailed textual information on Beethoven's life or audio recordings of his works.

The arrows in FIG. 2A show the types of progressions through a document which are possible with the standard multimedia user interface. The standard multimedia user interface shown in FIG. 2A reflects a four way structure indicative of the four exit paths available from each of the pages in document 200. For example, at page 220, one path exists to a (presumed) previously-accessed page 210; a second path exists to the next page 230 in sequence on the same level as page 220; a third path exists to page 220; and a fourth path exists to page 272 which is the first in a sequence of pages having more detailed information than page 220.

Figure 2B:
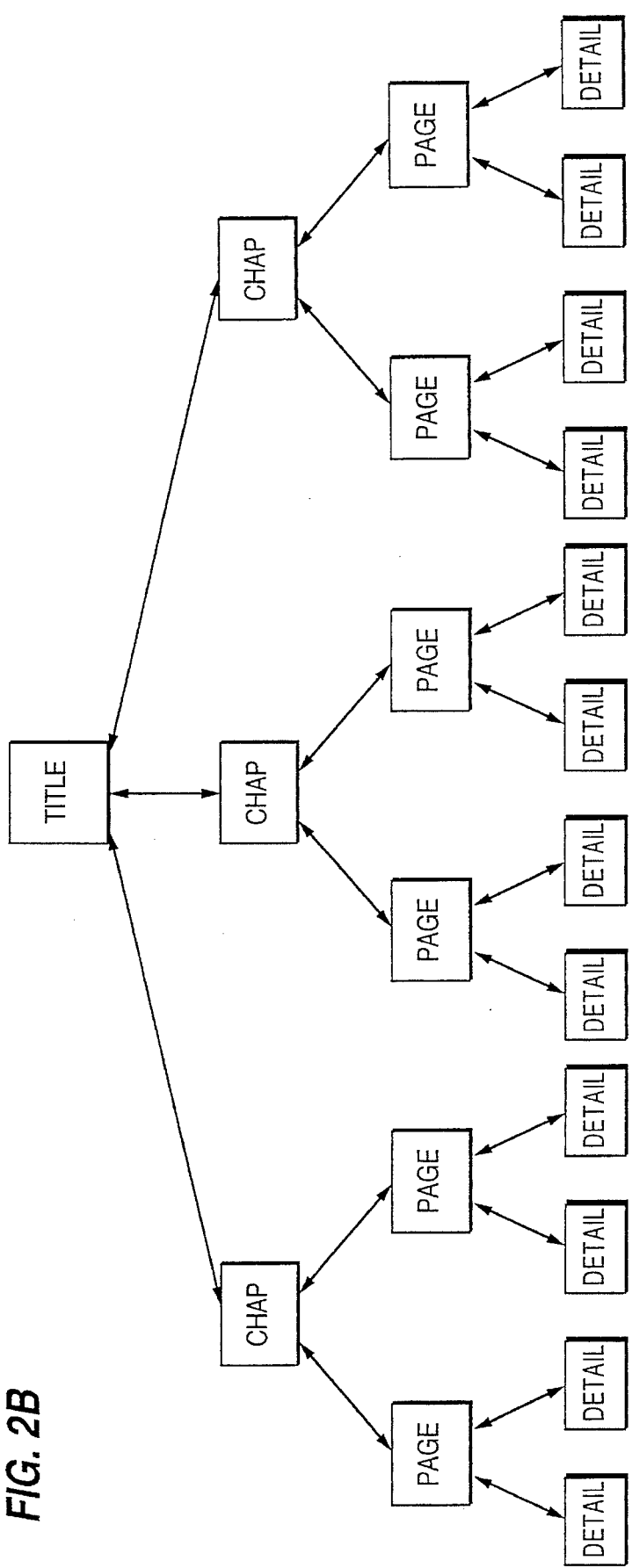
FIG. 2B shows a block diagram of the conventional hierarchical menu structure currently in use in known multimedia systems.

The standard multimedia-user interface stands in stark contrast to a conventional two-way tree structure 206 shown in FIG. 2B. In FIG. 2B, the only allowable paths between portions of the documents are between levels, and the levels do not necessarily represent relative amounts of detail. Traversal of portions at the same "level" requires movement upward to a common parent, and then downward to the desired portion.

In some sense, the four-way standard multi-user interface shown in FIG. 2A reflects the manner in which printed documents, such as books, are used. When one looks through a book, one normally proceeds sequentially through pages. One can look to the chapter summary if less detail is needed, or look at the footnotes on a page (or other source material such as appendices or glossaries) for more detail. The interface shown in FIG. 2A provides that same ease of use for multimedia documents.

In the present invention, each document must contain at least one page, called the title page. The title page identifies the title of the corresponding document and is the entry point (i.e., the first page displayed) when the corresponding document is selected. In FIG. 2A, page 205 is the title page for document 200.

The preferred implementation of documents and pages in this invention employs object-oriented software techniques. A software "Object" is a well-known concept for software engineers and is understood to represent a collection of software modules, such as algorithms or data, or both, which collectively perform a specific task. As demonstrated below, objects can include other objects.

Figure 3:
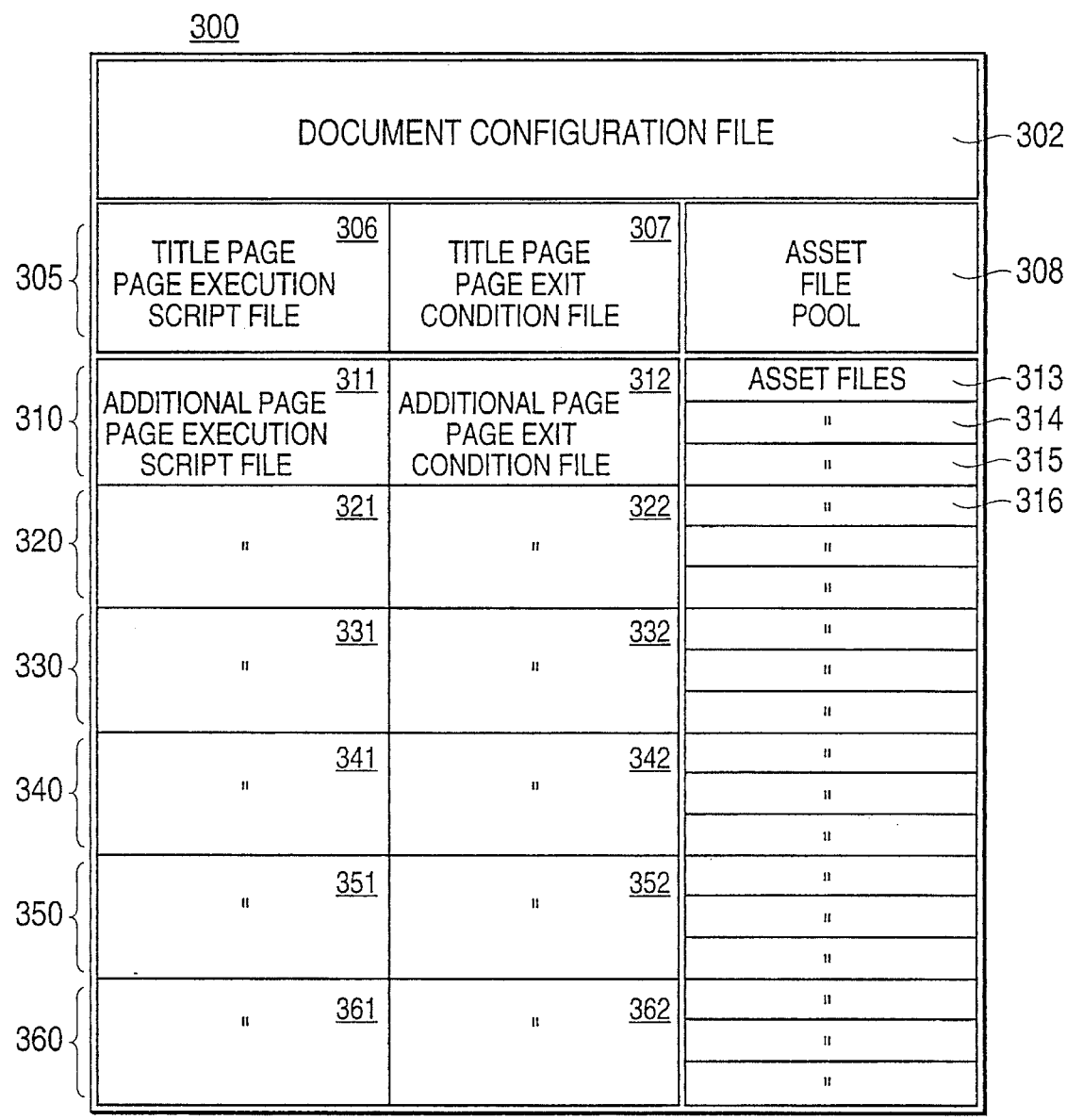
FIG. 3 shows a document object for use in the preferred implementation of this invention.

FIG. 3 shows a document object 300 which can represent document 200 for purposes of understanding this invention. Document object 300 includes a document configuration file 302, which contains the information required by the standardized runtime module to open the corresponding document. Although the precise contents and organization of document configuration file 302 will depend on certain conventions required by CPU 120 and system software 125, most of the design of document configuration file 302 will be determined by the architect of system 100 based upon information needed to open a file. File 302 will typically include information regarding the title of the corresponding document, its location in memory 110, as well as its size and structure.

Document object 300 also includes a number of page objects 305, 310, 320, 330, 340, 350, and 360. Each page object corresponds to a different page in the document represented by document object 300. For example, if document object 300 represents document 200 in FIG. 2A, then, page object 310 could represent page 210, page object 320 could represent page 220, etc. Obviously, document object 300 would need to have a much greater number of page objects if it were to represent document 200 accurately.

Each page object includes certain files: a page execution file. For example, title page object 305 preferably includes title page execution script file 306, title page exit condition file 307, and various asset files from the pool of assets. Each document object contains a pool of asset data files 308, representing digitized visual and audio information. Page object 310 includes page execution script file 311, exit condition file 312, and asset files 313, 314, 315 and 316. The asset files, are in a "pool" and can be part of more than one page object.

Page execution script files 306, 311, 321, 331, 341, 351, and 361 each contain software modules which are processed when the corresponding pages of the particular document are selected. For example, a page execution script file might cause the display of a portion of text with some graphics, or the running of a video clip.

The digitized information which is decoded and converted to analog output as a result of processing an execution script file is called an asset. An asset is the smallest body of information in the multimedia system of the invention. Generally, an asset consists of a discrete body of digital data stored as an individual file in document memory 110 of system 100. An asset may consist of binary data equivalent to a photograph, a video clip, a sound recording, a body of text, a computer program, a graphic (still or animated), or any portion of the above. A given asset can also be incorporated into more than one page and can be used more than once in the same page.

Each page must have at least one asset, but the number of determining what information should be in an asset, but generally the amount of information will typically be a coherent body of information, coherence being determined by content, and the amount of information in an asset should be small enough to promote sharing of assets, but large enough to minimize the steps needed in forming a page object from assets in the pool.

In the preferred implementation, assets are stored as asset files and incorporated in page objects, which in turn are incorporated into document objects. As FIG. 3 shows, document object 300 has several asset files. For example, asset files 313, 314, 315 and 316 could be incorporated in page object 310 as well as in other page objects.

An asset can also contain logical algorithms to control exit conditions. For example, if the multimedia document were a training manual, one of the assets could be an algorithm to analyze answers given to a series of multiple choice questions. Based on the answers to those questions, one of several different pages could be accessed next. Alternatively, if the document were a test, the next page to be accessed could depend on the score of the test.

The page exit condition files 307, 312, 322, 332, 342, 352, and 362 determine the actions to be taken upon receipt of a corresponding input signal. This concept is explained in greater detail below, but briefly, the exit conditions define the next page to be executed when the user presses certain keys or otherwise indicates user choices.

Figure 4:
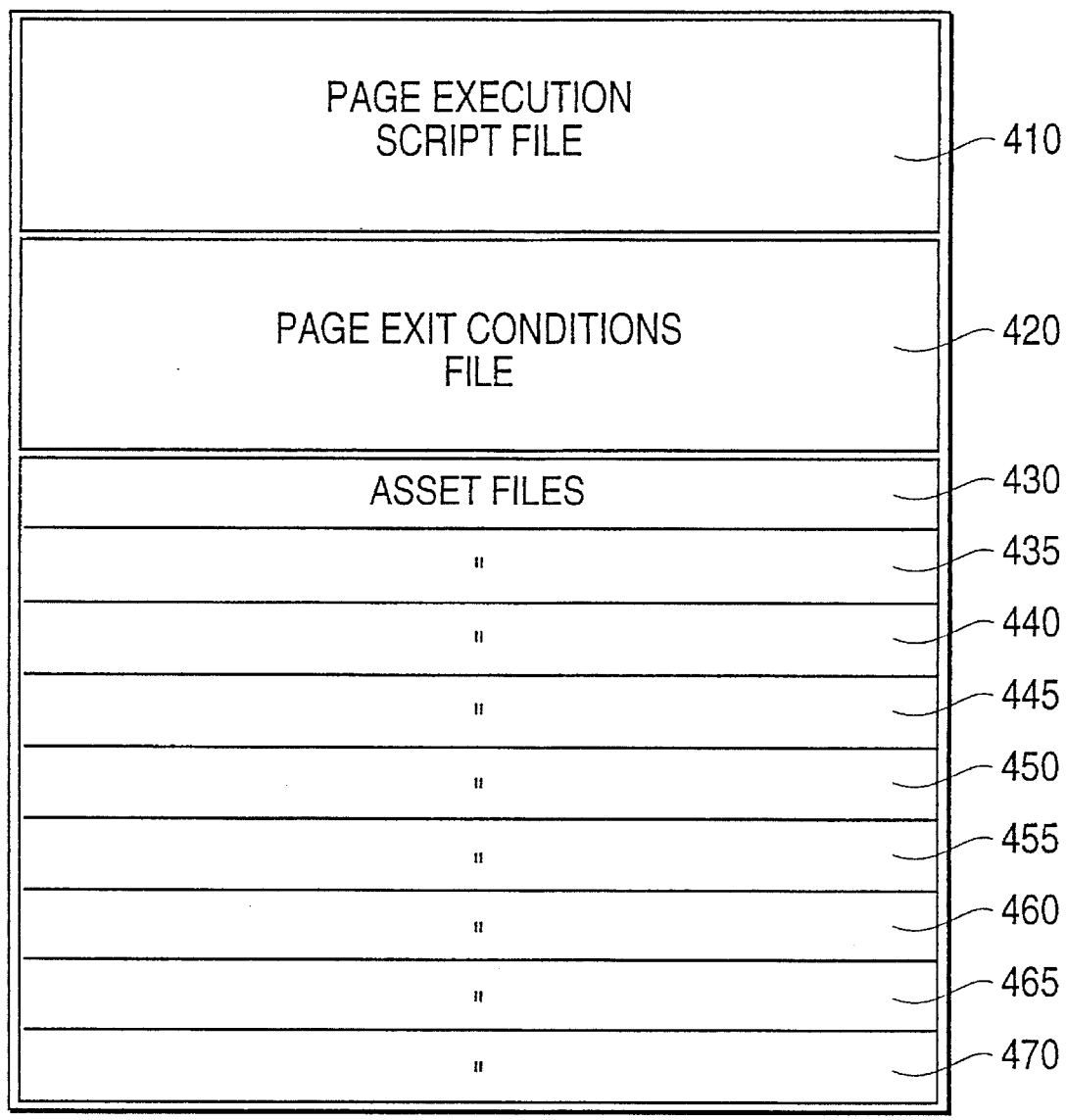
FIG. 4 shows a page object for use in the preferred implementation of this invention.

FIG. 4 shows an individual page object 400 which includes a page execution script file 410, an exit conditions file 420, and asset files 430, 435, 440, 445, 450, 455, 460, 465, and 470.

Another type of page is the menu page. The menu page differs from other pages in that it provides more than one exit condition. Menu pages preferably contain one or more "hot spots," which are locations on a display. Each hot spot corresponds to its own exit condition, which can be either another page or another hot spot on the same or a different page.

Figure 5:
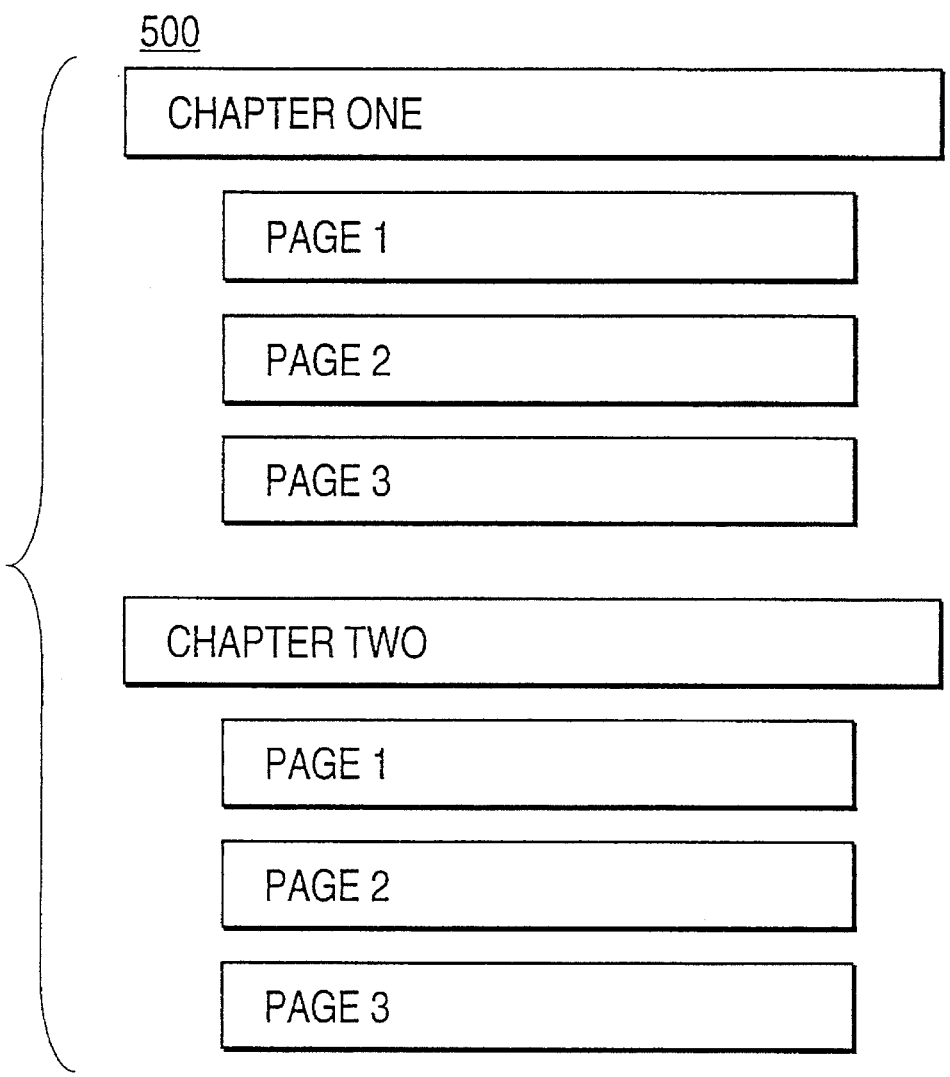
FIG. 5 shows a portion of the screen display of a menu page configured as a table of contents or an index for use with a preferred implementation of this invention.

One type of menu page is a table of contents page, such as is embodied by the screen display of table of contents 500 shown in FIG. 5. Table of contents 500 lists the different pages of a document in a predetermined sequence, such as the sequence which the pages are intended to be traversed. The author would associate a hot spot with each listing, and the user could select a page for access directly by selecting the hot spot associated with that page. Hot spots are preferably selected using the same basic user inputs provided for in the user input devices described below.

Table of contents 500 also shows chapters into which the pages are organized. Chapters, such as chapters 290, 291, and 293 in FIG. 2A, are the highest level of detail of the pages under the title page 205 and can be used to organize and summarize the information in several other pages. The chapters in the document being illustrated have thus the same function, in a general sense, as chapter summaries in a book, or the headlines in a newspaper, and a user can select a chapter to find out general information covered in greater depth in the chapter's pages.

A menu page that is similar to the table of contents is the index file. In fact, FIG. 5 can also be an illustration of an index file. An index file would contain a listing of various characteristics or features of a document, similar to the index of a book. A hot spot would be associated with each feature, and selection of a hot spot would cause multimedia system 100 to access the associated page.

Figure 6:
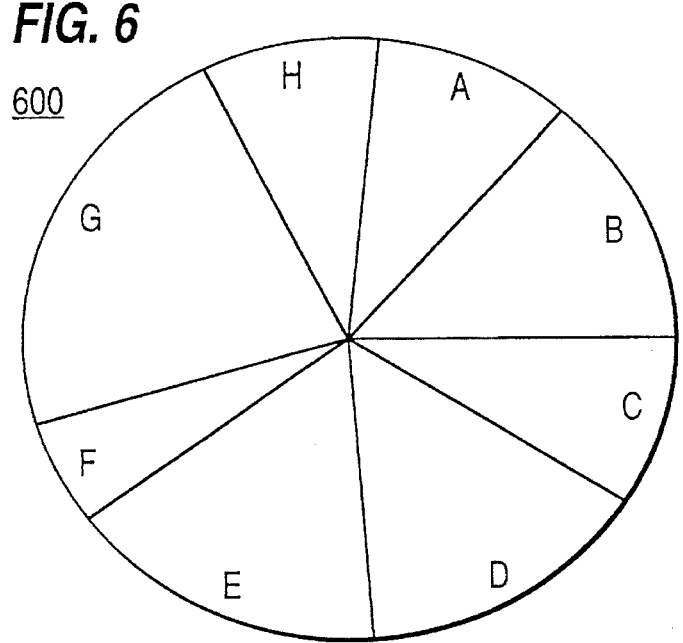
FIG. 6 shows an example of the screen display of a menu page configured as a graph for use with a preferred implementation of this invention.

Another use of menu pages is to present a useful key to certain information, such as a graph 600 in FIG. 6. In graph 600, each displayed portion would be a hot spot, and selection of one of the hot spots would cause multimedia system 100 to access a page with information about that portion. For example, if the document were an agricultural guide reflecting the percentage of a state's production due to each of several products, selection of a portion could cause access to a page with summary agricultural information for that product. More detailed information could be obtained as explained above.

Figure 2C:
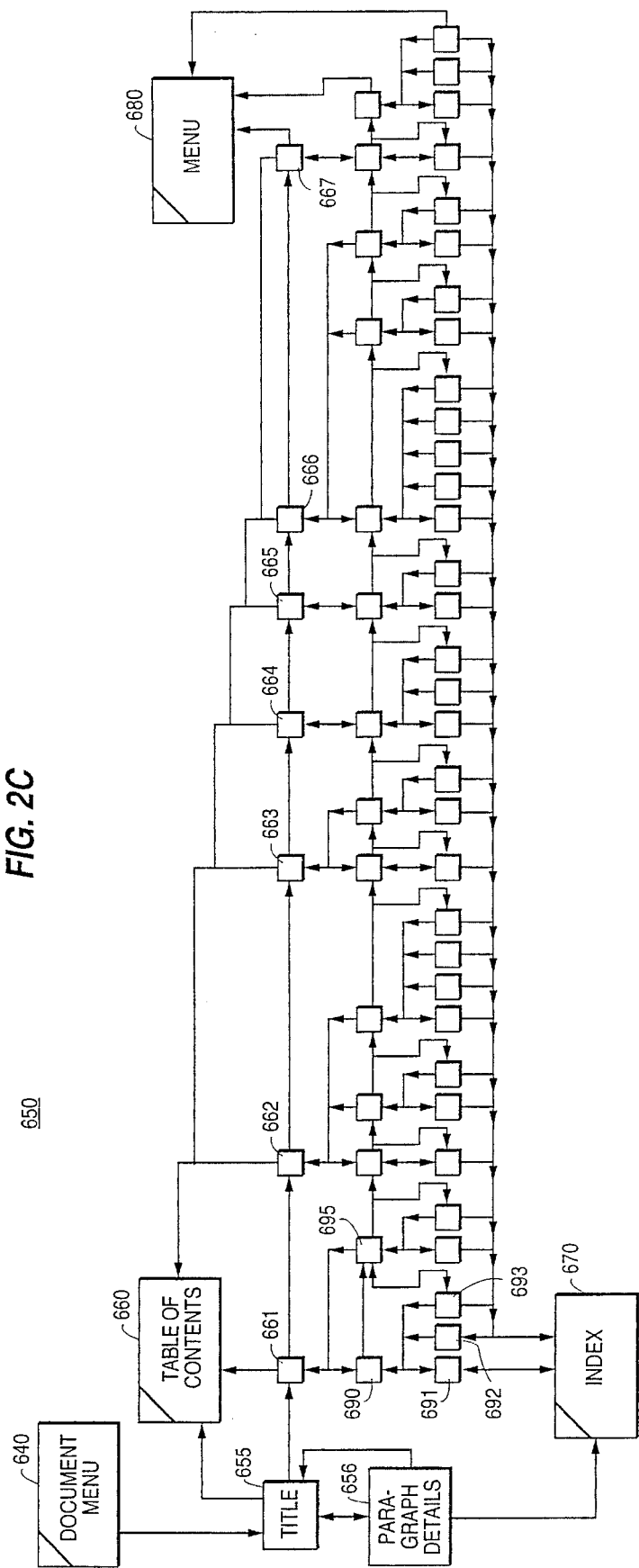
FIG. 2C shows a block diagram of a document organized according to this invention which includes menu pages.

With the understanding of menus provided above, the use of menus in the standard multimedia user interface system of this invention can be appreciated. FIG. 2C shows a multi-level document structure which includes menus in accordance with this invention. FIG. 2C also shows a document menu containing listings of all the documents available to multimedia system 100. AS FIG. 2C illustrates, a document 650 would be listed on document menu 640. Once the title of document 650 were chosen from document menu 640, the next page accessed by system 100 would be title page 655 of document 650. Title page 655 would have as exit conditions either a table of contents menu page 660, a chapter summary page 661, or a publishing detail page 656. Publishing detail page 656 would contain the information now included on the copyright page of a book.

If table of contents menu page 660 were chosen, it would appear with a number of hot spots that would each correspond to a different one of the pages shown in FIG. 2C. For simplicity of drawing, not every page is separately identified, and the only exit condition paths which are shown are to chapters 661, 662, 663, 664, 665, 666, and 667. Typically, table of contents page 660 would include an exit condition path to each of the pages in document 650.

In a like manner, index menu page 670 only shows exit condition paths to certain of the pages, but in actuality, there would likely be a path to each of the pages in document 640.

FIG. 2C also demonstrates an interesting manner of organizing the sequence of the pages. When there are a series of pages at the same level, and the pages all have the same "parent," such as pages 691, 692, and 693, under parent 690, the author must decide which page should be the next one accessed in order after the last page in the series. For example, page 693 is the last page in a sequence, and there is no necessary choice for the next page.

For document 650, the author decided that the last page in the series under one parent would be immediately succeeded by the first page in series after the parent of the current page. For example, the current page is page 693, the next page would be page 695, which is at the next higher level and which is also the next page after page 690, page 693's parent page. This is just one implementation, however, and the author of document can make other choices.

In table 650, the author also decided to make a menu page the next page to be accessed after the absolute last page at a particular level were accessed. This menu is a document ending menu 680. When the last page at any level is reached, and a user presses an key seeking the next page of that level, document menu page 680 would be accessed which would give the user a message that there are no more pages at that level. The user would also be presented with several options, such as closing the document or accessing pages at a different level.

One other feature of table 640 which is not shown is the backtrack function. This feature is described in more detail below.

To use the document structures described above, the multimedia system must have some processing capability. In accordance with the present invention, the multimedia document system includes processing means, coupled to the memory means, for accessing the documents from the memory means, for executing the logical operations specified in the page execution script of the pages in the documents, and for performing the actions specified in the exit conditions of the pages in the documents. In the preferred embodiment shown in FIG. 1, the processing means includes CPU 120 and system software 125. System software 125 may reside in the same memory devices as document memory 110 or in a separate device.

CPU 120 and system software 125 preferably include a standard computer platform, such as the microprocessor chips of the IBM PS/2 and the OS/2 operating system, along with run-time modules that operate in a manner consistent with the description of this invention. The operation of system software 125 is discussed below following a description of the hardware components of system 100.

FIG. 7 shows a memory system schematic of the preferred orientation of the memory system as it relates to the elements in FIG. 1. Preferably, the system software 125 and the CPU 120 are coupled to the document memory 110 which includes a document data portion 710 and a current page data portion 720. Document data portion 710 includes all the data for the documents which can be accessed by system 100, and current page data portion 720 includes only that data needed for the page currently being processed by system 100.

As explained above, document memory 110 preferably includes a primary RAM and secondary memory such as a disk or tape. Document data portion 710 is preferably stored in secondary memory. Document data portion 710 can also be stored in RAM, but this may be impractical for large documents and multimedia systems. It is also possible, through proper memory management techniques, to place part of document data portion in secondary storage and part in RAM.

Assets are preferably stored as binary digital files in document data portion 710. To save memory space, the assets can be stored in compressed format.

Preferably, current page data portion 720 is stored in RAM to allow fast access by the CPU 120 and to provide efficient and quick output to devices 150.

Figure 8:
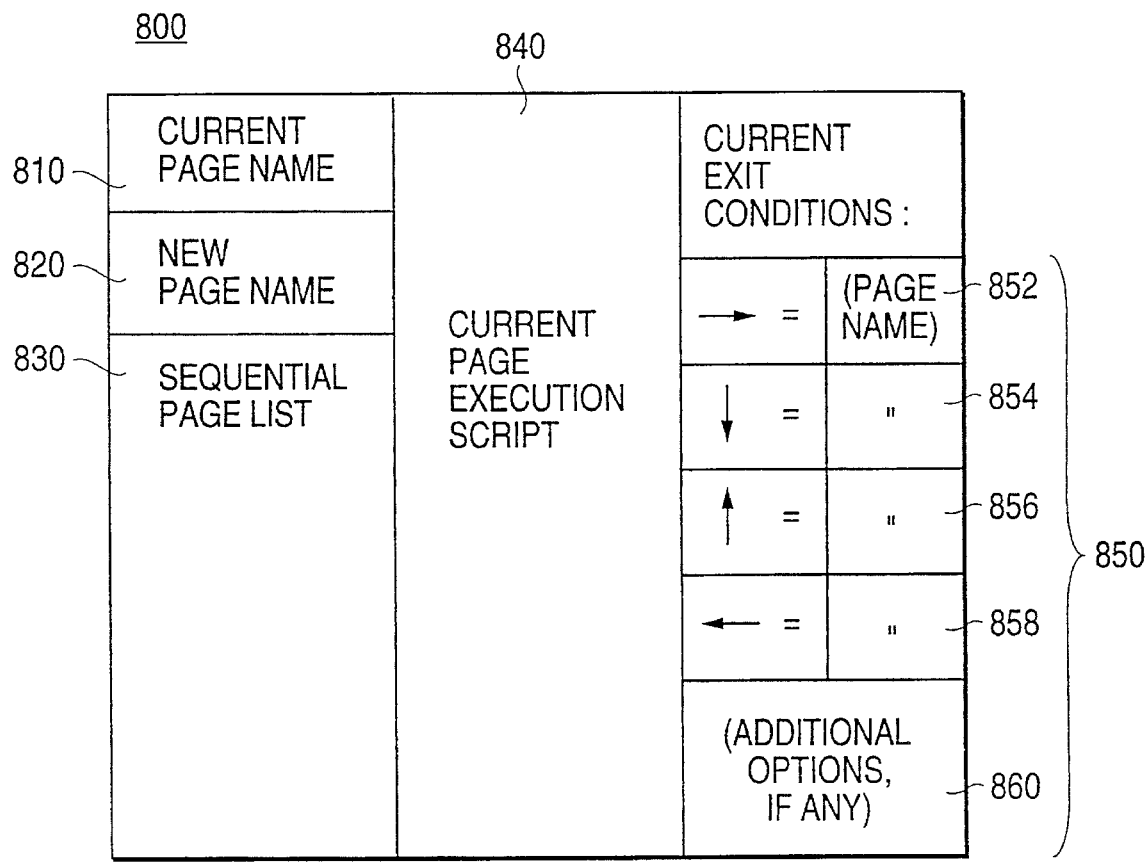
FIG. 8 shows the structure of a current page in the memory system of FIG. 7 in accordance with a preferred implementation of this invention.

FIG. 8 shows a schematic of the memory structure 800 for the current page data portion 720. Page memory structure 800 includes the page name portion 810 for the page currently being processed, as well as a new page name portion 820 recorded as the result of executing an exit condition.

Page memory structure 800 also includes a sequential page list portion 830 which is required to execute the backtrack function. The backtrack function, which is optional, makes it possible to access, in reverse order, the pages previously accessed.

Also included in the current page memory structure 800 are a current page execution script 840 and current exit conditions 850. Current page execution script 840 is the execution script for the page currently being processed. Current exit conditions 850 define the exit conditions for the page currently being processed. More specifically, exit conditions 850 identify a page for each of the possible user inputs. For example, page name 852 corresponds to the page to be accessed when a rightward pointing arrow key is pressed; page name 854 corresponds to the page to be accessed when a downward pointing arrow key is pressed; page name 856 corresponds to the page to be accessed when an upward pointing arrow key is pressed; and page name 858 corresponds to the page most recently accessed and is used to implement the backtrack function, if that option is selected by the author.

Page memory structure 800 also allows the implementation of additional user input options. Such options might include direct access to a table of contents or index page, access to a help page, or assistance in opening or closing a document. All such options could also be implemented through other means, for example, other keyboard inputs, functions, or options such as assets with logical algorithms. Options location 860 is provided in structure 800 for such functions or options.

Also in accordance with the present invention, the multimedia system includes user input means, coupled to the processing means, for permitting a user of a multimedia system to provide input signals corresponding to the exit conditions of pages in the document. In the preferred implementation, such user input means includes user input devices 130 shown in FIG. 1. Preferably, one of the user input devices 130 is keyboard 900 shown in FIGS. 9A and 9B. Keyboard 900 includes a main key set 910 which includes an upward pointing key 911, a leftward pointing key 912, a downward pointing key 913, a rightward pointing key 914, and a central "PAUSE" key 915.

The preferred functions of the keys in key set 910 can be appreciated by referring back to page memory structure 800 in FIG. 8. Upward pointing key 911 is used to select a page at the key 912 is used to implement the optional backtrack function, or to select the prior page at the same level. Downward pointing key 913 is used to select a page at the next most detailed level. Rightward pointing key 914 is used to select the next page in sequence at the same level. PAUSE key 915 suspends the operation of the multimedia system 100 until any of the keys in key set 910 is pressed.

Keyboard 900 also includes several optional keys. One is the Table of Contents key 920, which calls up the table of contents for the document currently being accessed. Another is Index key 930 which calls up an index for the document currently being accessed. "How to Use" key 950 provides the user with an ability to select pages with instructions corresponding to the use of multimedia system 100 or to the document being displayed. Start key 960 is used to allow the user to start the display of the document currently available in memory 100 and begin an initialization sequence. Stop key 970 is used to stop the display of the document currently in use and return to a document menu which lists the documents available for system 100 operation.

Figure 9A:
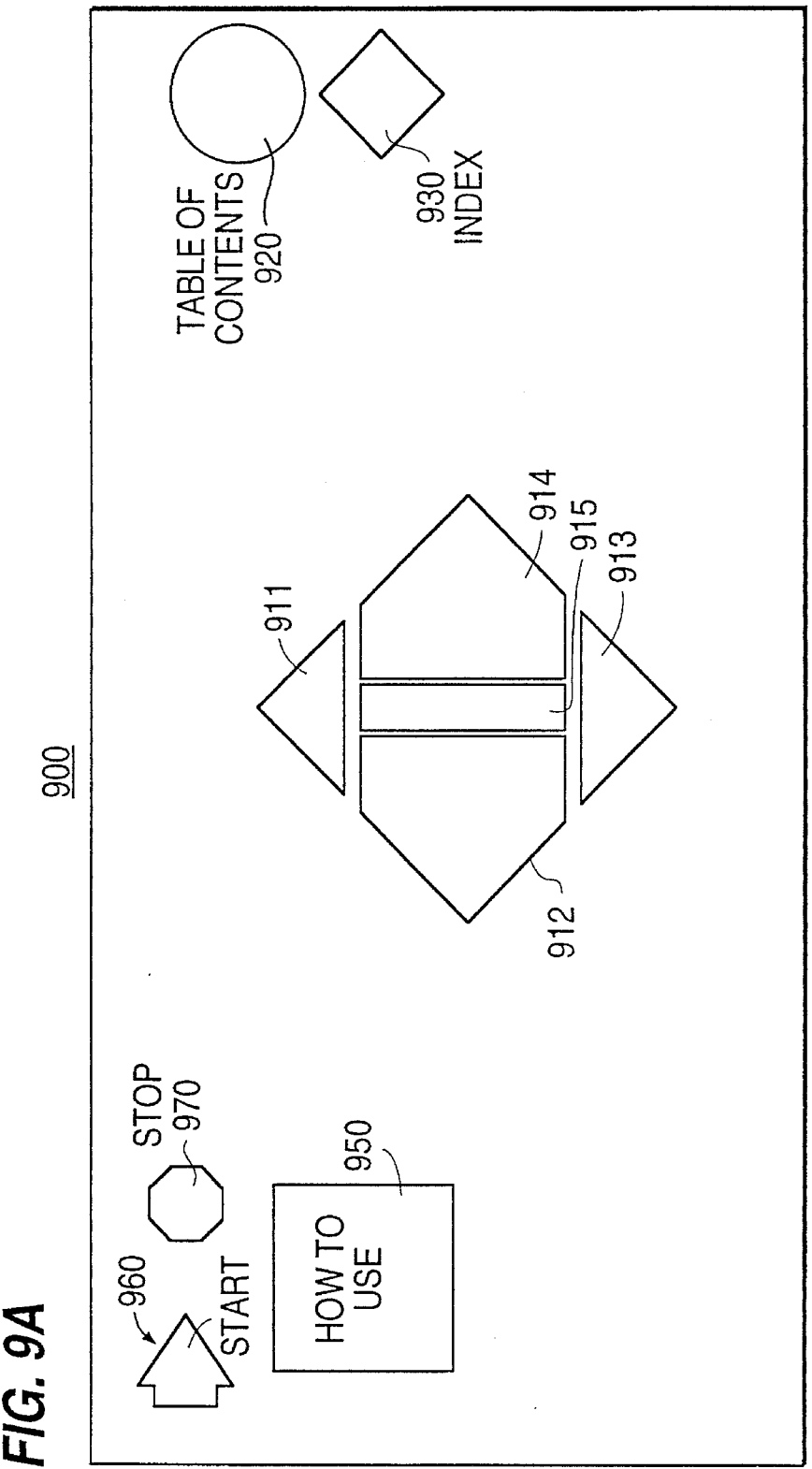
FIG. 9A shows an overhead view of a preferred implementation of a keyboard that can be used with the system in FIG. 1.
Figure 9B:
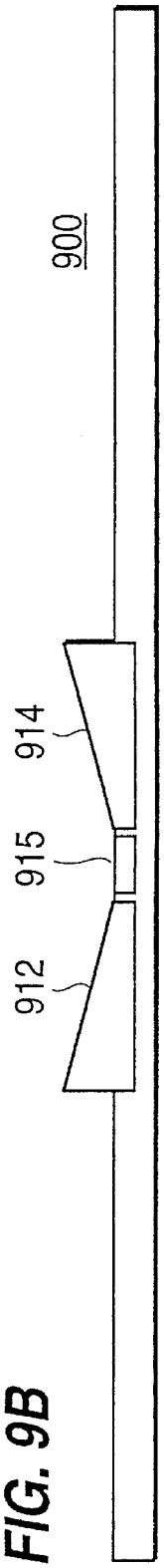
FIG. 9B shows a cross-section of the keyboard in FIG. 9A.

FIG. 9B shows a profile taken across the midpoint of keyboard 900 shown in FIG. 9A. As the profile view in FIG. 9B shows, PAUSE key 915 is relatively short. This is for ergonometric reasons. The surrounding keys 911 (not shown), 912, 913 (not shown), and 914 are canted inward, also for ergonometric reasons.

Of course, other input devices, such as a mouse, a standard keyboard, a touch screen, a stylus pad, a joy stick, a trackball, a virtual reality device or a voice recognition device, can be used instead of or in addition to keyboard 900. Keyboard 900 can also have a variety of different designs.

The specific implementation of keyboard 900 shown in FIG. 9 provides certain advantages. First, it is relatively simple to use because it only has the keys that are necessary for operation of the preferred implementation of the invention. Second, the design of the keyboard maximizes the use of the keyboard. For example, all of the keys in the middle and the main key set 910 are placed together so that one can easily traverse a document without having to look down at the keyboard.

Also in accordance with the present invention, the multimedia system includes output means, coupled to the processing means, for outputting to the user the information from ones of the documents and pages selected by the processing means in response to commands from the user input means. Preferably, the output means includes CODEC and DAC 140 and the output devices 150 (FIG. 1). Output devices 150 preferably include a video display terminal and audio speakers, but the output devices should be tailored to the particular documents that are in the multimedia system 100.

CODEC and DAC 140 preferably includes the DVI processor manufactured by Intel Corporation, which was described in detail above. The CODEC and DAC 140 includes a circuit which takes compressed information from memory 110, decompresses it in real time, and converts the decompressed information to an analog signal to drive a CRT or speaker. If DAC 140 is the Intel DVI chip set, it can also be used to compress data generated by the author of a document.

With the preceding understanding of the hardware, the preferred configuration and operation of certain portions of the system software can be better understood. Not every function of the system software is described because persons of ordinary skill will be able, without undue experimentation, to implement multimedia system 100 given the information provided above about the hardware and below about the software.

FIG. 10 shows the different components of system software 125 surrounded by solid lines. The hardware elements to which the different components relate are shown surrounded by dotted lines.

System software 125 includes CPU operating system 1010, microprocessor microcode 1020, I/O drivers 1030, CODEC/DAC microcode 1040, and standard multimedia user interface module 1050. Operating system 1010 and microcode 1020 are typically supplied with CPU 120. I/O drivers 1030 are also provided either with CPU 120 or with user input devices 130. In the preferred implementation, CODEC/DAC microcode 1040 is provided with CODEC/DAC 140. The only software which must be specially written for the preferred implementation is the standard multimedia user interface module 1050. It is also possible to incorporate the operating system 1010, device drivers 1030, and interface module 1050 into a singular software object which includes the standard multimedia interface.

Standard multimedia user interface module 1050 includes software for opening and closing document objects and executing page objects The procedures which are described below are procedures for opening a document and for executing a document.

Figure 11:
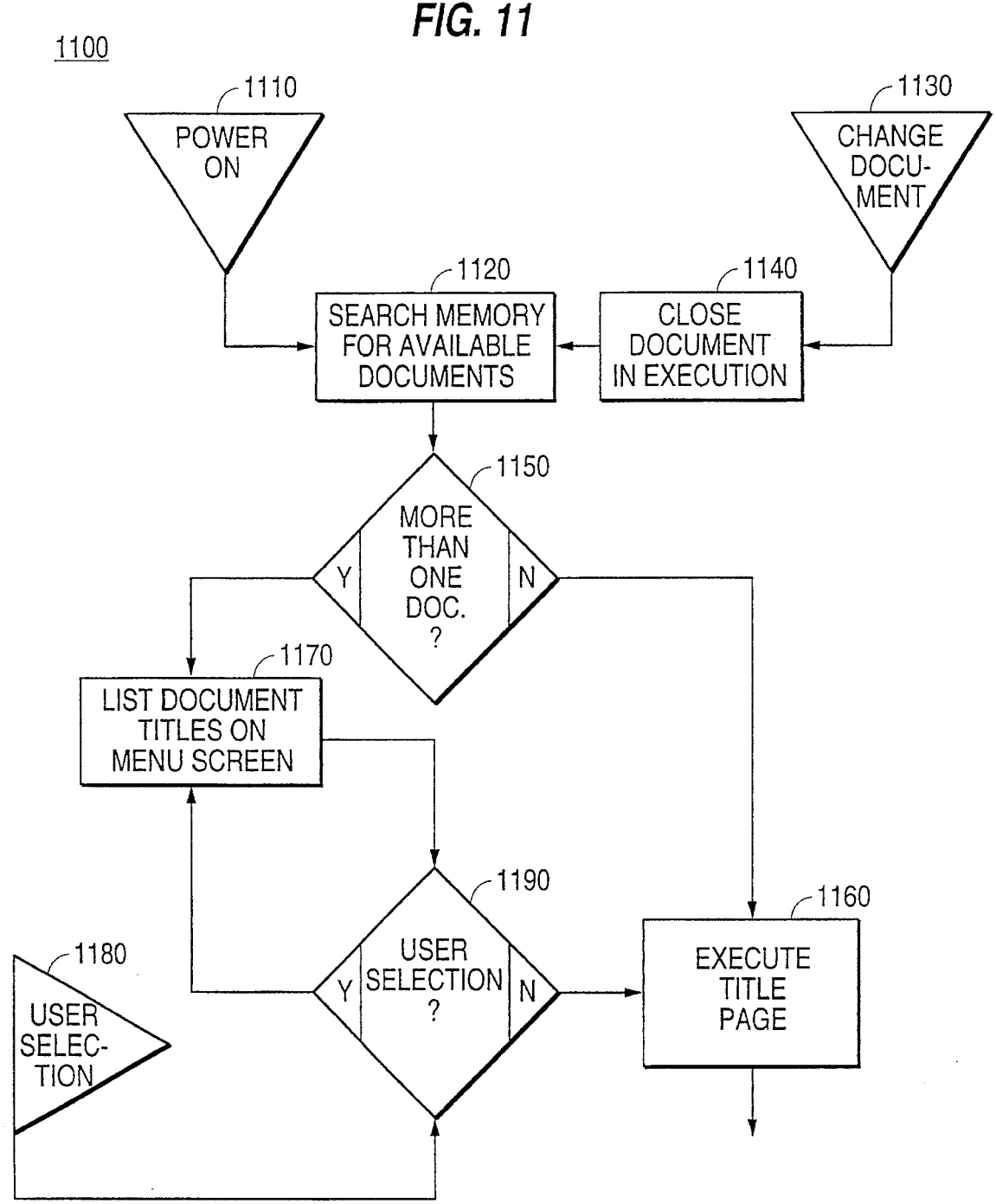
FIG. 11 shows a flow diagram of a preferred procedure for opening a document in accordance with a preferred implementation of the present invention.

FIG. 11 shows a flow diagram of a procedure 1100 for opening a document in accordance with the present invention. Procedure 1100 can begin either by turning the power on (step 1110), or by changing a document (step 1130). If the power is turned on (step 1110), multimedia system 100 fetches from memory 710 a list of available document titles (step 1120).

The same list is fetched if a document is to be changed, such as pressing stop key 970 in FIG. 9. If a document is being changed (step 1130) by manually removing it from document data storage 710, as for example a CD-ROM, then the document currently being executed is closed (step 1140) before fetching the list of available documents (step 1120). Closing a document involves removing it from current memory (see FIG. 8).

If there is only one document in the list (step 1150), then the title page of that document is executed (step 1160). If there is more than one document available in memory 710 (step 1150), then the titles of all the available documents are listed on a menu screen (step 1170). When a user selection of one of the documents (step 1180) is detected (step 1190), the title page of the selected document is executed.

Figure 12:
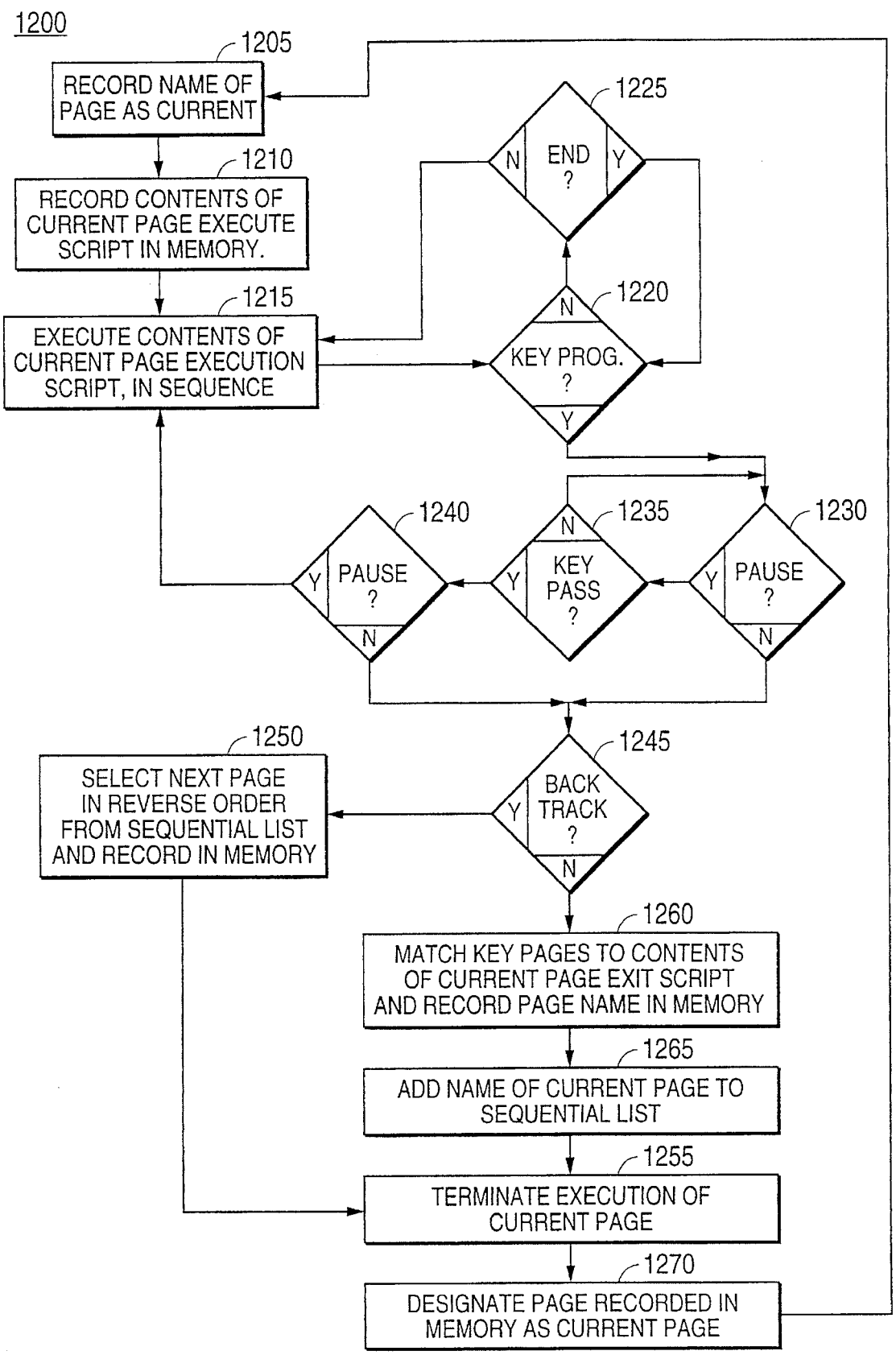
FIG. 12 shows a flow diagram of a preferred procedure for executing a page in accordance with a preferred implementation of the present invention.

FIG. 12 shows a flow diagram of a procedure for executing a page in accordance with the preferred implementation of the invention. The procedure 1200 shown in FIG. 12 begins with recording the name of the page selected as current (step 1205). The first current page is always the title page (see step 1160 in FIG. 11). If the memory structure 800 of FIG. 8 were used, the title page name would be stored first in current page name portion 810.

Next, the contents of the current page execution script and exit conditions are recorded in memory (step 1210). If memory structure 800 were used, the current page execution script would be recorded in portion 840, and the current exit conditions would be stored in portion 850.

Next, the contents of the current page execution script are executed in sequence (step 1215). Periodically during execution of the page execution script, CPU 120 determines whether an action with input devices 130, such as a key being pressed, has occurred (step 1220). If not, and if the execution of the page execution script is not completed (step 1225), then the execution of that script continues (step 1215). If a key has not been pressed (step 220) and the execution of the page execution script is complete (step 1225), then CPU 120 waits for a key to be pressed (step 220).

When a key has been pressed during page script execution (step 1220), and that key is the PAUSE key (step 1230), then CPU 20 waits for that key or another key to be pressed (step 1225). When some key is pressed (step 1235), and it is the PAUSE key (step 1240), the current page execution script resumes execution (step 1215).

If the second key that is pressed is not the PAUSE key (step 240), or if the key pressed originally was not the PAUSE key (step 1230), then a determination is made whether the key that was pressed is the backtrack key (step 1245). If so (step 1245), then the next page in reverse order from the sequential list (e.g., list 830 in FIG. 8) in document memory 110 is selected (step 1250), and the execution of the current page is terminated (step 1255).

If the key that was pressed is not the backtrack key (step 1245), then the key which was pressed is matched to the contents of the current page exit conditions and the name of the corresponding page is recorded in memory (step 1260). If the memory structure 800 in FIG. 8 is used, the page would be recorded in new page name portion 820. The name of the current page is then added to the sequential list (step 1265), and the execution of the current page is terminated (step 1255).

After terminating the execution of the current page, the new page name which was recorded in memory (e.g., in portion 820) is designated as the current page (step 1270), and procedure 1200 is repeated beginning with the recording of the new page name as the current page (step 1205).

As can be seen by the description of the preferred implementation, the system of this invention uses a standard format for the document stored in memory. The standard multimedia interface permits easy access to and traversal of the documents, and that access is facilitated by menu pages.

The procedures Just described for opening a document and executing the pages are preferably performed on multimedia system 100. There are other software and procedures which apply to this code which is used by an author to create pages and documents and to organize the document structure for later use in a multimedia system. The authoring code need not run on CPU 120 of multimedia system 100, although it could, and in that case multimedia system 100 would have dual use.

In general, the authoring code is used to create the page execution scripts which instruct the multimedia system when to display or play the information contained in the assets. The times specified can be either in absolute or relative times. Furthermore, in the case of a visual display, the page execution script also specifies the position on the surface of a video display terminal where the information should be displayed or the timing of audio information. The page execution script can also be used to specify the volume for audio information and the color value for visual information.

The authoring code creates documents which conform with the document object and page object structure in accordance with this invention. Preferably, the authoring software provides a high level programming language which provides an author with a computer language that has verbal or visual symbols that correspond to the precise actions which the computer is capable of performing. One such programming language which is currently available is the AVK API for the C programming language, available from the Intel Corp. After being written, the source code version of the authoring code is compiled into binary code understood by the microprocessor.

Figure 13:
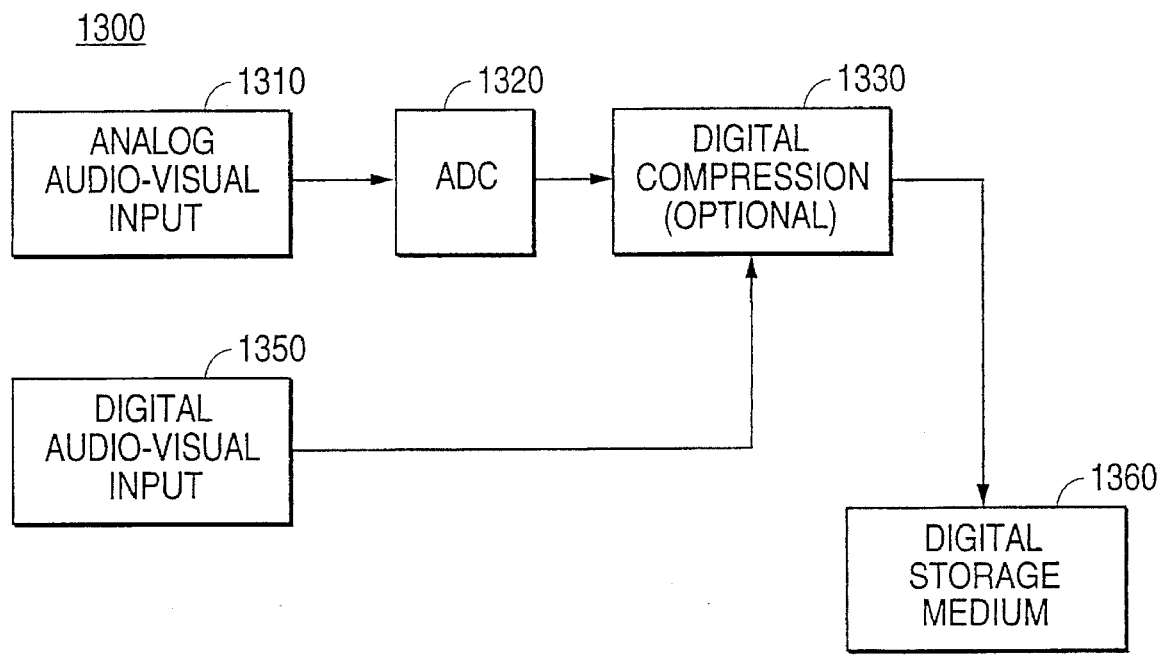

Authoring a document in accordance with this invention requires the creation of assets, the creation of pages, and finally the creation of documents. FIG. 13 shows a block diagram 1300 with preferred steps for creating audio or visual assets. Analog information 1310, is converted to digital information by an analog to digital converter circuit 1320, and then optionally compressed using a digital compression circuit 1330. Although use of digital compression circuit 1330 is optional, it has been found that such compression makes the use of multimedia systems much more efficient and responsive. As explained above, the DVI chip set used in CODEC/DAC 140 in FIG. 1 can be used to compress data.

If the audio or visual information is already in digital format, such as information 1340, that digital information would be fed to a digital compression circuitry 1330 as explained above.

The digitized and compressed information is then stored in some type of digital storage medium 1350 in form of files which can be accessed by the multimedia system 100. The files would be created so that they could be stored and accessed in accordance with the operating software of the multimedia system 100.

Figure 14:
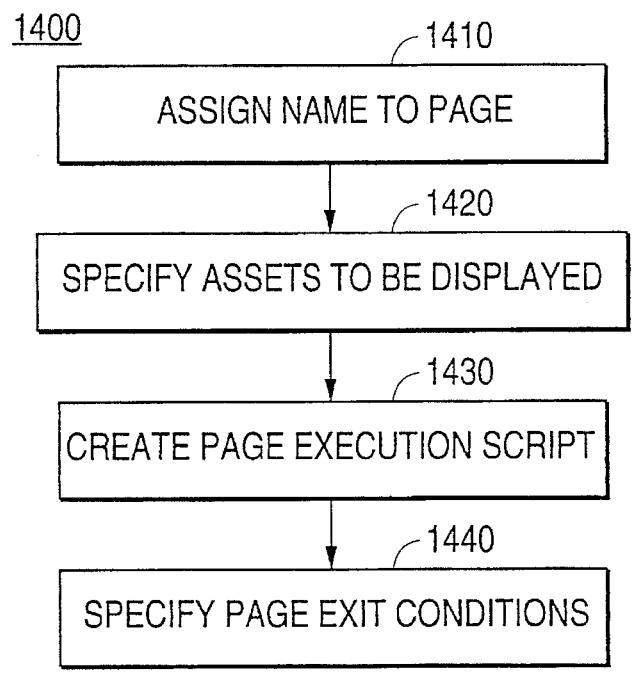
FIG. 14 shows a flow diagram of a preferred procedure for creating a page object in accordance with this invention.

FIG. 14 shows a flow diagram 1400 for creating pages from assets. In diagram 1400 first a name is assigned to the page (step 1410). Next, the assets which are to be associated with the page are specified (step 1420). This is usually done by incorporating them in the page execution script for that page.

Next, the page execution script is created (step 1430). This script is usually written in either the authoring code described above, or in a pseudo-code derived from it, such as in FIG. 15A.

Figures 15A, 15B, 16:
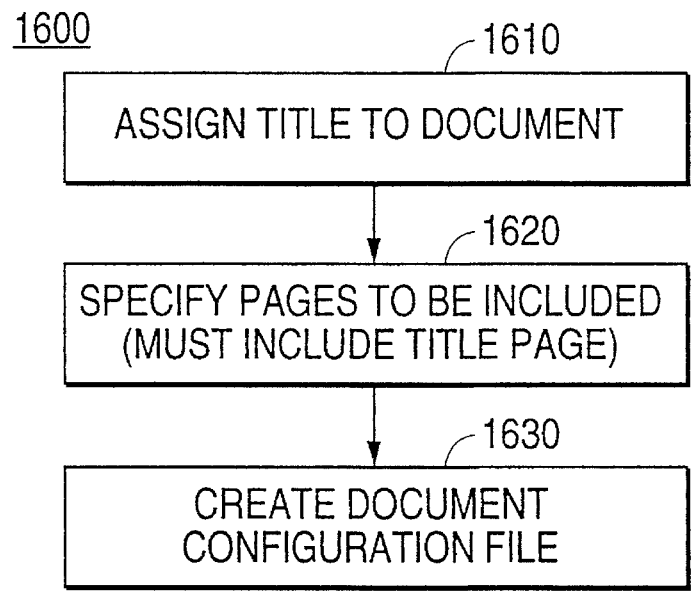
FIG. 15A shows an example of page execution script created using the procedure in FIG. 14.
FIG. 15B shows an example of page exit conditions created using the procedure in FIG. 14.
FIG. 16 shows a flow diagram of a preferred procedure for creating a document in accordance with this invention.

FIG. 15A shows a page execution script 1500 for a sample page. Page execution script 1500 includes four instructions. The first is to play videoasset 1. The second is to show still photoasset 2. The third step is to play (denoted as "HEAR") audioasset 1. The fourth step is to move a graphicasset 1 from a window 3 to window 7 using normal speed and a straight line path. Thus, when the page corresponding to page execution script 1500 is executed, a video asset will be played, then a still photograph will be shown and an audio asset played. Finally, a graphic asset will be moved from one position on the video display to another position using a straight line path at a default speed.

The final step in creating a page is to specify the exit conditions. This preferably done by using the same techniques for creating a page execution script, described above.

FIG. 15B shows sample exit conditions. The right arrow exit condition is page B1 and the up arrow exit condition is page A3. The down arrow, rather than corresponding to another similar page, instead directs the user to an index page. The left arrow, in accordance with the convention indicated above, corresponds to the backtrack function.

Once the pages are created, creation of a document is relatively straightforward. As explained above, a document object is merely one or more page objects plus a document configuration file.

Flow diagram 1600 in FIG. 16 shows a procedure for creating a document object. The first step is to assign a title to the document ( step 1610 ). Next, the pages to be included are specified (step 1620). One of these pages needs to be a title page. Finally, a document configuration file is created (step 1630). The steps of creating a document are preferably done using an authoring language such as the one described above. The same authoring software is used to create page objects (FIG. 14), page execution scripts (FIG. 15A), page exit conditions (FIG. 15B), and document objects (FIG. 16)..

Once a document is created, it can be added to a multimedia system such as multimedia system 100. This involves loading all the software into the memory and including the name of that document onto a document page in a manner which allows the multimedia system 100 to associate the document title with the corresponding software.

The invention described above thus allows use of standard conventions which are adaptable to any type of multimedia information. The document structure also makes using that information easy and efficient.

The foregoing description of the preferred implementations of this invention has been presented for purposes of illustration and description. It is not intended to be exhaustive or to limit the invention to the precise forms disclosed. Modifications and variations are possible in light of the preceding teachings, or may be acquired from practice of the invention. The scope of the invention is defined by the following claims and their equivalents.

We claim:

1. A multimedia system for outputting digital information from documents, the multimedia system comprising:

memory means for storing a plurality of documents, each of the documents including
a discrete number of pages that may each be accessed with a single user input, each page containing
at least one asset file to be accessed by the system,
a page execution script for specifying logical operations to be performed on the asset files contained in the same page, and
a set of exit conditions, each exit
condition specifying an action to be executed upon receipt of a corresponding input signal;

processing means, coupled to the memory means, for accessing the documents from the memory means, for executing the logical operations specified in the page execution scripts of the pages in the documents, and for performing the actions specified in the exit conditions of the pages in the documents;

user input means, coupled to the processing means, for permitting a user of the multimedia system to provide input signals corresponding to the exit conditions of the pages in the documents; and output means, coupled to the processing means, for outputting to the user information from ones of the documents accessed by the processing means.

2. The system of claim 1 wherein each of the pages in each of the documents is associated with at least one level, the level indicating a degree of detail of the information in the associated page.

3. The system of claim 2 wherein the set of exit conditions for a selected one of the pages includes access of a page at a level above or below the level of the selected page.

4. The system of claim 3 wherein the user input means includes a keyboard with keys indicating the selection of a page on the level above or below the level of the selected page.

5. The system of claim 2 wherein the pages in each of the documents are organized into one of a plurality of associated chapters containing summary information describing the associated pages, and wherein each of the chapters is on the same level.

6. The system of claim 1 wherein the each of the pages in each of the documents is organized into a predetermined series, and wherein the set of exit conditions for a selected one of the pages includes access of the next page in the predetermined series.

7. The system of claim 6 wherein the user input means includes a keyboard with keys indicating the selection of next page in the predetermined series.

8. The system of claim 1 wherein the memory means contains a log of the pages having page execution scripts with logical operations that have been executed, the pages being organized in the order of the execution of the page execution script logical operations, and wherein the set of exit conditions of a selected one of the pages includes access to the one of the pages accessed immediately prior to the selected page.

9. The system of claim 8 wherein the user input means includes a keyboard with keys indicating the selection of the page which was accessed immediately prior to the selected page.

10. The system of claim 1 wherein the user input means includes a keyboard with a plurality keys, and signaling means, coupled to the keyboard, for generating the input signals when the keys are selected by the user.

11. The system of claim 10 wherein the plurality of keys includes next page keys which correspond to exit conditions for a selected one of the pages, the exit conditions for the selected page each specifying the access of another one of the pages, and a pause key which cause the processing means to freeze execution of the logical operations in the page execution scripts.

12. The system of claim 11 wherein the plurality of pages are organized into at least three levels, and wherein next page keys include a first key indicating the selection of a page on the level immediately higher than the level of the selected page, a second key indicating the selection of a page on the level immediately lower than the level of the selected page, a third key indicating the selection of the page which is next in a predetermined sequence, and a fourth key indicating the selection of the page which was accessed immediately prior to the selected page.

13. The system of claim 1 wherein one of the pages in each of the documents is a title page containing a title for the associated document.

14. The system of claim 1 wherein the output means includes a video display.

15. The system of claim 14 wherein one of the pages in at least one of the documents is a menu page which causes the video display to include at least one hot spot area on the video display for enabling a user to supply a user input to specify one of the exit conditions for the menu page, and wherein the processor means includes means for executing any action in the exit condition specified by each of the hot spots in the menu page.

16. The system of claim 15 wherein the menu page is a table of contents page listing the pages in a corresponding one of the documents in a predetermined sequence, and wherein associated with each of the pages listed in the table of contents page is an associated hot spot which corresponds to an exit condition that causes access of the associated page.

17. The system of claim 15 wherein the menu page is an index page listing a plurality of characteristics in a corresponding one of the documents and, for each of the characteristics, the ones of the pages having that characteristic, and wherein associated with each of the pages listed in the index page is an associated hot spot which corresponds to an exit condition that causes access of the associated page.

18. The system of claim 1 wherein selected ones of the documents include at least one menu page, each of the menu pages containing an array of logical processing options for the processing means to perform.

19. A method of executing actions corresponding to a desired page in a document in a multimedia system for outputting digital information from asset files in said desired page of said document, wherein the document includes a plurality of pages, each page including at least one asset file and a page execution script specifying logical operations to be performed on the asset files and a set of exit conditions, wherein each page is accessible by a single user input, wherein each exit condition specifies an action to be executed upon receipt of a corresponding input from a user of the multimedia system, the method including the steps, performed by the multimedia system, of:

executing the page execution script of the desired page;

determining the presence of an input from the user; and executing, when a user input is present, the one of the actions in the exit conditions which corresponds to that user input for said desired page.

20. The method of claim 19 wherein the multimedia system also includes a plurality of additional pages, and wherein the actions specified for each of the exit conditions is an access to a corresponding one of the additional pages, and wherein the step of taking the one of the actions specified in the exit conditions includes the substep of
accessing the one of the additional pages identified in the corresponding exit condition.

21. The method of claim 20 wherein the multimedia system includes a memory with a current page data portion containing the information for a current one of the pages whose page execution script is currently being executed by the multimedia system;

wherein the method also includes the steps of designating a selected one of the pages as the current page, and storing in the current page data portion information for the current page; and wherein the substep of selecting the one of the pages identified in the corresponding exit condition includes the substep of designating the selected page as the current page.

22. The method of claim 19 wherein the step of executing the page execution script of the page includes the substep of outputting to a output device the information in one of the asset files.

23. The method of claim 22 wherein one of the user inputs is a PAUSE instruction and wherein the multimedia system has a visual output device displaying a visual output; and wherein method further includes the steps, performed by the multimedia system upon receipt of the PAUSE instruction, of ceasing the execution of the page execution script; and maintaining on the visual output device the visual output currently being displayed.

24. The method of claim 19 wherein the multimedia system includes a plurality of pages organized into at least one document, and wherein the method further includes the step, performed by the multimedia system, of opening a selected one of the documents.

25. The method of claim 24 wherein the step of opening a selected document includes the substeps of presenting a list on a display device of the documents in the multimedia system capable of being opened, and receiving an input from the user indicating the selected one of the documents.

26. In a multimedia system which outputs digital information, a method of accessing a desired page within a document containint a plurality of pages with a single user input, each page including at least one asset file and a page execution script specifying logical operations to be performed on the asset files and a set of exit conditions, wherein each page is accessible by a single user input, wherein each exit condition specifies an action to be executed upon receipt of a corresponding input from a user of the multimedia system, the method comprising the steps, performed by the multimedia system, of:

executing the page execution script for said desired page specifying logical operations to be performed on asset files in said desired page, the asset files including digital information;

receiving a user input indicating an action to be executed; and performing a corresponding exit condition in response to the received user input for said desired page.

27. In a multimedia system which outputs digital information, a memory containing the digital information organized into a plurality of page objects which represent a document, each of the page objects comprising:

at least one asset file to be accessed by the system;

a page execution script for specifying logical operations to be performed on the asset files contained in the corresponding one of the page objects; and a set of exit conditions each specifying an action to be taken upon receipt of a corresponding input signal.

28. In a multimedia system which outputs digital information, a memory containing the digital information organized into a document object, the document object including at least one page object and comprising:

at least one asset file to be accessed by the system;

at least one page execution script file corresponding to each page object in the document object for specifying logical operations to be performed on the asset files pages; and a set of exit conditions corresponding to each page object, each of the exit conditions specifying an action to be executed upon receipt of a corresponding input signal.

29. The document object of claim 28 wherein the document also contains a title page object including the name of the document.

* * * * *